UNITED STATES PATENT OFFICE.

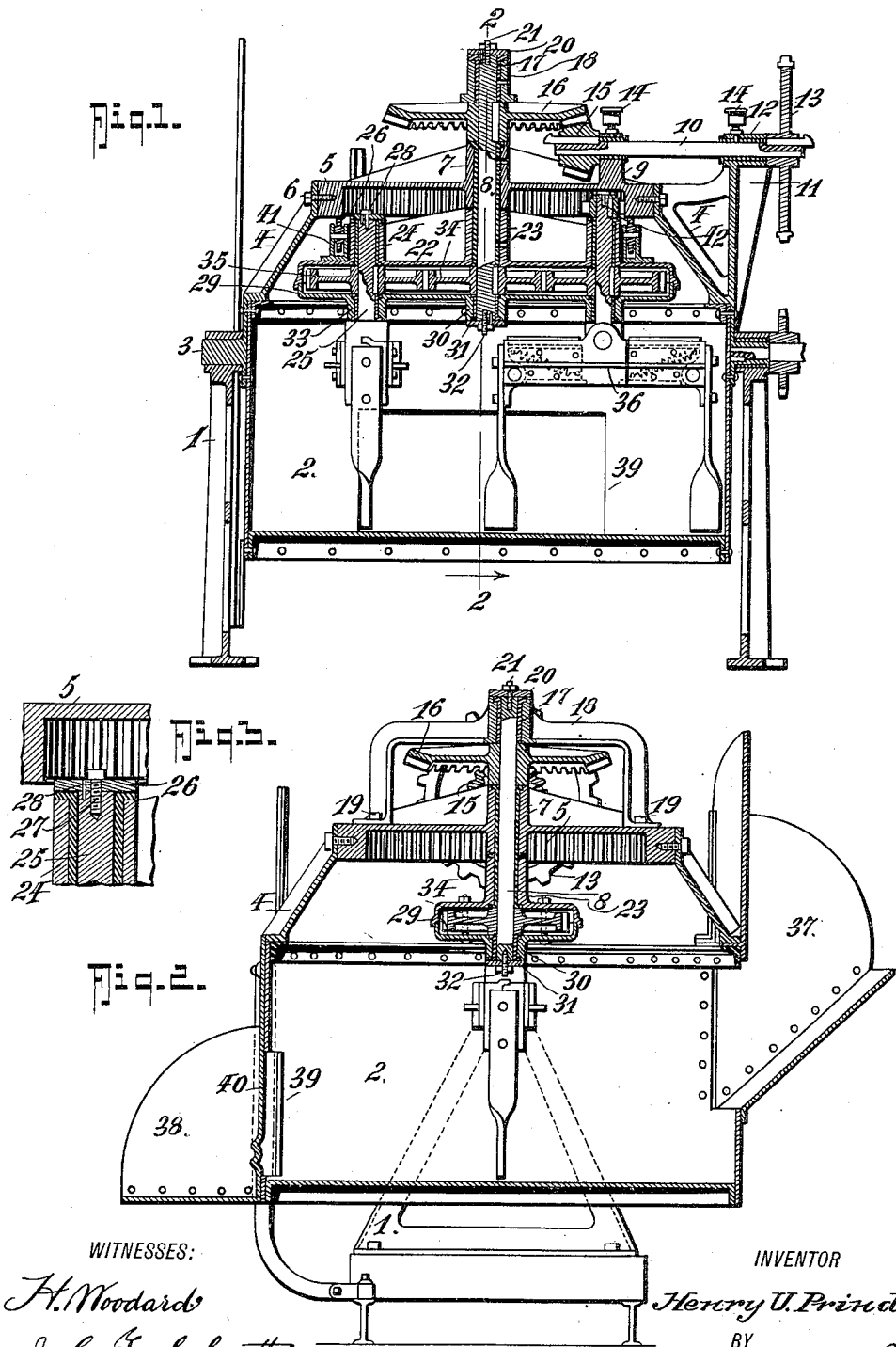

HENRY U. PRINDLE, OF SAN FRANCISCO, CALIFORNIA, ASSIGNOR TO PLANETARY MACHINERY COMPANY, OF SAN FRANCISCO, CALIFORNIA, INCORPORATED.

GEARING.

1,064,930. Specification of Letters Patent. Patented June 17, 1913.

Original application filed July 18, 1911, Serial No. 639,214. Divided and this application filed October 2, 1912. Serial No. 723,486.

*To all whom it may concern:*

Be it known that I, HENRY U. PRINDLE, residing at San Francisco, in the county of San Francisco and State of California, have invented certain new and useful Improvements in Gearing, of which the following is a specification.

My invention relates to certain new and useful improvements in mixing machines and the like, and the invention primarily has for its object to provide an improved gearing for driving the working implement shafts in a planetary manner from a main power shaft.

This application is a divisional part of my copending application filed July 18, 1911, Serial #639,214.

In its more detailed nature, the invention includes those novel details of construction, combination and arrangement of parts, all of which will be first fully described, then be specifically pointed out in the appended claims, and illustrated in the accompanying drawing, in which:

Figure 1, is a central vertical section and part elevation of the invention. Fig. 2, is a section on the line 2—2 of Fig. 1, looking in the direction of the arrow. Fig. 3, is an enlarged detail sectional view of a portion of the apparatus.

In the drawing, in which like letters and numerals of reference indicate like parts in all of the figures, 1 designates the supporting standards for the tank or receptacle 2, which has trunnions 3 mounted in bearings in said standards.

4 designates bracket members which are mounted above the tank 2 and carry the internal rim gear and trackway 5 to which they are secured by bolts 6, or otherwise. The internal rim gear 5 has a web which carries the bearing 7 for the main transmitting shaft 8 on which the master gear 16 is keyed. The shaft 8 is also mounted in a bearing 17 carried by a yoke frame 18 that is mounted on the top of the gear 5, it being understood that the gear 5 does not turn. The gear 5 also includes a bearing 9 for the driving shaft 10 which is also mounted in a bearing 11 on one of the brackets 4 and is driven from any suitable source of power through a driving pulley or gear 13.

14 are lubricant cups which convey the lubricant to the bearings 9 and 12.

Keyed on the shaft 10 is the drive pinion 15 which meshes with the gear 16.

The frame 18 is secured at 19 to the internal rim gear 5 and the shaft 8 is held from dropping by a cap plate 20 that is secured at 21 to the upper end of the shaft 8.

22 is the upper half of the gear housing which contains the planetary gears, the housing 22 having a central bearing 23 for the shaft 8 and bearings 24 paralleling the bearing 23 for the working implement shafts 35. The shafts 25 are held from dropping by disks 26 secured at 27—28 to the respective shafts 25.

29 is the lower half of the gear case which has a central bearing 30 for the shaft 8, the bearing 30 alining with the bearing 23 and it also has bearings 33 for the shafts 25 the bearings 33 alining with the bearings 24. The lower half of the gear case is held from dropping by a disk 31 secured at 32 to the lower half of the shaft 8. It is also held from dropping by the bearings 33 abutting the working implements 36.

34 is a gear secured to turn with the shaft 8 and mesh with the gears 35 on the shafts 25.

The working implement 36 may be of any construction, depending upon the work that is to be done and for convenience of illustration, I have shown such implement as a mixing paddle.

37 is the entrance to the tank 2 and 38 is the outlet chute adjacent to the outlet 39, which outlet is controlled by a suitable sliding door, or otherwise, as may be found convenient.

In order to prevent wabbling of the shaft 8 and to take care of the upthrust on the gear case 22—29 when in operation, idler rollers 41 are secured to the gear case sections 22 to bear against the underside of the smooth peripheral portion of the internal rim gear 5.

In operation, power is applied to the shaft 10 which is transmitted through the gears 15—16 to the shaft 8 causing it to turn in one direction. The motion of the shaft 8 is transmitted to the gears 34—35 to the shaft 25 which rotate in directions opposite to that of the shaft 8. In order to attain the planetary movement, at least one of the shafts 25 is provided with a pinion 42 which meshes with the internal rim gear 5 at all times and rides around the same, as will be clearly understood by reference to Fig. 1 of the drawing.

In this application, I make no claim to the mixing machine *per se* as that forms the subject matter of my original application.

It should be understood that any type of working implement 36 may be attached to the shafts 25 depending upon the nature of the work to be done, paddles being used for mixing, rotary cutters for cutting purposes, etc.

Slight changes in the details of construction and design of the parts may be readily made without departing from the spirit of the invention or the scope of the appended claims.

What I claim is:—

1. Supporting brackets, an internal head gear rigidly mounted on said brackets and having a shaft bearing, a driven shaft rotatable in the said bearing, a gear carrier, a master gear on the said shaft, bearings on the said gear carrier, a driven element carrying shaft rotatable in the said carrier-held bearings, a gear on the said driven element shaft that meshes with the master gear, and a pinion on the said driven element shaft that meshes with the head gear, and a driven element on said carrying shaft.

2. Supporting brackets, an internal head gear rigidly mounted on said brackets and having a shaft bearing, a driven shaft rotatable in the said bearing, a gear carrier, a master gear on the said shaft, bearings on the said gear carrier, a driven element carrying shaft rotatable in the said carrier-held bearings, a gear on the said driven element shaft that meshes with the master gear, a pinion on the said driven element shaft that meshes with the head gear, bearing rollers carried by the said gear carrier, the head gear having a frame on which the said rollers run, and a driven element on said carrying shaft.

3. In a machine, standards, supporting brackets mounted on the bearings, a head gear rigidly mounted on the brackets, the said gear receiving a shaft bearing, a driven shaft rotatable in the said bearings, a gear carriage having bearings, a master gear on the driven shaft, a driven element carrying shaft mounted in the gear carrier bearings, a driven element on the carrying shaft, a pinion on one end of said carrying shaft that meshes with the head gear and a gear on the said shaft that meshes with the master gear.

4. In a machine, standards, supporting brackets mounted on the bearings, a head gear rigidly mounted on the brackets, the said gear receiving a shaft bearing, a driven shaft rotatable in the said bearings, a gear carrier having bearings, a master gear on the driven shaft, a driven element carrying shaft mounted in the gear carrier bearings, a driven element on the driven element carrying shaft, a pinion on one end of said driven element carrying shaft that meshes with the head gear and the gear on the said shaft that meshes with the master gear, said supporting brackets being tiltably mounted on the standards.

5. In a machine, standards, supporting brackets mounted in the standards, a head gear rigidly mounted on the supporting brackets, and having a central shaft bearing, a driven shaft rotatable in the said shaft bearing, a gear casing comprising upper and lower yoke plates rotatable with the shaft, said casing having upper and lower alining bearings, a master gear on the driven shaft located within the said casing, a driven element carrying shaft mounted in the alining bearings of the yoke members, a driven element carried on the lower end of the said shaft, a pinion on the upper end of the shaft that engages the head gear, a gear on said carrying shaft that engages the master gear on the driven shaft, and means mounted on the standards for imparting motion to the driven shaft.

H. U. PRINDLE.

Witnesses:
C. D. SWETT,
J. R. MILLER.

Copies of this patent may be obtained for five cents each, by addressing the "Commissioner of Patents, Washington, D. C."